April 14, 1959     D. L. McKAY     2,882,133
CRYSTAL PURIFICATION APPARATUS AND PROCESS
Filed Dec. 27, 1954

INVENTOR.
D. L. McKAY
BY Hudson and Young
ATTORNEYS

United States Patent Office 2,882,133
Patented Apr. 14, 1959

2,882,133

CRYSTAL PURIFICATION APPARATUS AND PROCESS

Dwight L. McKay, Bartlesville, Okla., assignor to Phillips Petroleum Company, a corporation of Delaware Application December 27, 1954, Serial No. 477,838

6 Claims. (Cl. 23—295)

This invention relates to the separation of components of mixtures by crystallization. In one of its more specific aspects the invention relates to an improved apparatus for the purification of crystals. In another of its more specific aspects it relates to a device for minimizing the tendency for channelling in a crystal purification column.

The separation of components of mixtures can be effected by various methods including distillation, solvent extraction and crystallization. Although distillation and extraction are generally preferred because of economic and convenience of operation, there are some instances in which such processes cannot be successfully utilized. For example, many chemical isomers have similar boiling points and similar solubility characteristics and therefore cannot be separated satisfactorily by distillation or extraction. Furthermore components of some mixtures form azeotropes so that, even though their boiling points vary considerably, cannot successfully be separated by distillation.

Fractional crystallization has one great advantage over other methods of separation in that it is the only separation method which theoretically produces a pure product in a single stage of operation in systems in which the desired component of a mixture solidifies at temperatures above which the other components solidify. Thus, whereas distillation and extraction theoretically require infinite stages for a pure product, crystallization in many cases requires only one. This is because phase equilibrium occurs in distillation and extraction steps, whereas in crystallization, substantially pure crystals can be separated from solutions in one stage, regardless of liquid compositions. Crystallization is thus well suited, not only to the separation of many chemical isomers which can be separated by no other means, but also to the purification of many compounds which cannot be purified economically by other means.

Even though, as above stated, one stage of crystallization theoretically offers a pure product, attainment of this ideal operation has been difficult. Complete removal of occluded impurities without substantial loss in yield is required for attainment of the one stage separation.

Methods of separating the pure compound from a mixture have been devised, one of which is disclosed by J. Schmidt, Re. 23,810, whereby the mixture to be separated is introduced into a heat exchange zone wherein the mixture is cooled so that a slurry of crystals is formed and that slurry of crystals is then introduced into a purification chamber through which the crystals are moved as a compact mass, to a melting zone wherein the crystals are melted. A portion of the melt is displaced countercurrent through at least a portion of the crystal mass so as to displace occluded impurities from the mass approaching the melting zone. The exact mechanism, whereby this displaced liquid corresponding to the melt, improves the purity of the final product, is not completely understood. However, it is presently believed that the substantially pure material which is refluxed through at least a portion of the crystal mass displaces occluded impurities from the crystal mass approaching the melting zone and replaces the impurities in the interstices. At least a portion of the pure material is refrozen on the surface of the crystals. A high yield of product is obtained since the high melting product refreezes from the reflux stream as it comes in contact with the cold crystal mass moving toward the melting zone. Thus, the portion of the crystal mass which approaches the melting zone does not contain any appreciable amount of occluded impurities and the resulting product which is removed from the melting zone is of extremely high purity. It is desirable for best operation of such a purification system to remove as much of the unfrozen material (mother liquor) from the crystals as possible prior to introducing the crystals into the purification chamber. In this manner, many of the impurities can be eliminated from the purification system before subjecting the crystals to the final purification step.

The purity of the product from a crystal purification device as above described is governed by the effectiveness of the reflux which passes in countercurrent relationship to the passage of the compact crystal mass. The maximum rate of flow of reflux is principally governed by the ability of the reflux material to flow through the crystal bed without channelling. The melt should pass through the crystal bed and, through contact with the cold crystals, freeze and in freezing displace occluded mother liquor which then is displaced toward the mother liquor outlet.

It has been the usual practice to use electrical heaters or indirect heat exchange from a heated fluid to provide the heat for melting the crystals because recirculation of heated product as a source of heat has provided a flow of melt through the crystal mass which has caused excessive channelling. The use of electrical heaters or other indirect heat exchange means is not altogether satisfactory because the amount of heat required to provide sufficient melt for adequate reflux necessitates such high skin temperatures, of the heating elements, that heat sensitive materials such as dimethyl phthalates are discolored.

I have devised an improved crystal purification column having a heating section design which permits the use of recycled product for melting the crystals and at the same time controls the tendency of the increased flow of melt to channel through the crystal mass.

It is an object of this invention to provide an improved heating section for a crystal purification column.

It is another object to provide means for melting crystals in a crystal purification column with melted product.

It is still another object to provide a heater design for a crystal purification column which controls channelling. Other and further objects and advantages will be apparent to one skilled in the art upon study of the description of the invention and the accompanying drawing wherein:

Figure 1 is a schematic illustration of a crystal purification system embodying one modification of my invention, Figure 2 is a partially sectional side elevation of a modification of my invention, Figure 3 is a perspective view of the device of Figure 2, Figure 4 is a partially sectioned side elevation of another modification, and Figure 5 is a partially sectioned side elevation of still another modification.

Broadly speaking my invention provides a device which controls the course of the flow of the mass of crystals and also controls the flow of hot melted product through the crystal mass.

The method and apparatus of this invention can be advantageously utilized in practically any system to which fractional crystallization is applicable. This invention is applicable to separations in many multi-component systems, the components of which have practically the same boiling point and are, therefore, difficult to separate by fractional distillation, or to mixtures which have diverse boiling points but which form azeotropes or are heat sensitive. The effective separation of components of such mixtures may be made from systems where the concentration of one component is relatively high, or where the concentrations of the components are about equal. One particular advantageous application of the process lies in the purification of a component of, say, 15 to 25 percent purity, so as to effect a purity upwards of 98 percent. In order to illustrate some of the systems to which the invention is applicable, the following compounds are grouped with respect to their boiling points.

|  | B. P., °C. | F. P., °C. |
|---|---|---|
| Group A: | | |
| Benzene | 80 | 5.5 |
| n-Hexane | 69 | −94 |
| n-Heptane | 98.52 | −90.5 |
| Carbon tetrachloride | 77 | −22.8 |
| Acrylonitrile | 79 | −82 |
| Ethyl alcohol | 78.5 | −117.3 |
| 2,2-Dimethylpentane | 79 | −125 |
| 3,3-Dimethylpentane | 86 | |
| Methyl ethyl ketone | 79.6 | −86.4 |
| Methyl propionate | 79.9 | −87.5 |
| Methyl acrylate | 80.5 | |
| 1,3-Cyclohexadiene | 80.5 | −98 |
| 2,4-Dimethylpentane | 80.8 | −123.4 |
| 2,2,3-Trimethylbutane | 80.9 | −25 |
| Cyclohexane | 81.4 | 6.5 |
| Acetonitrile | 82 | −42 |
| Cyclohexene | 83 | −103.7 |
| 2-Methylhexane | 90 | −119 |
| 3-Methylhexane | 89.4 | −119.4 |
| Group B: | | |
| Methyl cyclohexane | 100.3 | −126.3 |
| Cyclohexane | 81.4 | 6.5 |
| n-Heptane | 98.52 | −90.5 |
| 2,2,4-Trimethylpentane (isooctane) | 99.3 | −107.4 |
| Nitromethane | 101 | −29 |
| p-Dioxane | 101.5 | 11.7 |
| 2-Pentanone | 101.7 | −77.8 |
| 2-Methyl-2-butanol | 101.8 | −11.9 |
| 2,3-Dimethylpentane | 89.4 | |
| 3-Ethylpentane | 93.3 | −94.5 |
| Group C: | | |
| Toluene | 110.8 | −95 |
| Methylcyclohexane | 100.3 | −126.3 |
| 2,2,3,3-Tetramethyl butane | 106.8 | 104 |
| 2,5-Dimethylhexane | 108.25 | −91 |
| 2,4-Dimethylhexane | 110 | |
| 2,3-Dimethylhexane | 113.9 | |
| 3,4-Dimethylhexane | 116.5 | |
| 3-Ethyl-2-methylpentane | 114 | |
| 3-Ethyl-3-methylpentane | 119 | |
| Group D: | | |
| Aniline | 184.4 | −6.2 |
| Toluene | 110.8 | −95 |
| Benzene | 80.0 | 5.5 |
| Group E: | | |
| Carbon Tetrachloride | 77 | −22.8 |
| Chloroform | 61 | −63.5 |
| CS₂ | 46.3 | −108.6 |
| Acetone | 56.5 | −95 |
| Group F: | | |
| Ortho-xylene | 144 | −27.1 |
| Meta-xylene | 138.8 | −47.4 |
| Para-xylene | 138.5 | 13.2 |
| Group G: | | |
| Ortho-cymene | 175.0 | −73.5 |
| Meta-cymene | 175.7 | <−25 |
| Para-cymene | 176.0 | −73.5 |
| Group H: | | |
| Dimethyl phthalate | 282 | 5.5 |
| Dimethyl isophthalate | 124 (12 mm.) | 67 |
| Dimethyl terephthalate | 288 | 140.6 |
| Group I: | | |
| Ortho-nitrotoluene | 222.3 | α−10.6, β−4.1 |
| Meta-nitrotoluene | 231 | 15.5 |
| Para-nitrotoluene | 238 | 51.3 |

Systems consisting of any combination of two or more of the components within any one of the groups may be separated by the process of the invention, as well as systems made up of components selected from different groups; for example, benzene may be separated from a benzene, n-hexane or n-heptane system in which the benzene is present in an amount greater than the eutectic concentration. In the same manner, para-xylene may be readily separated from a mixture of para- and meta-xylenes or from para-, meta, and ortho-xylenes. Benzene may also be separated from a mixture of toluene and/or aniline. Multi-component systems which may be effectively separated so as to recover one or more of the components in substantially pure form include 2,2-dimethylpentane, 2,4-dimethylpentane, 2,2,3-trimethylbutane, methyl cyclohexane, 2,2,4-trimethylpentane, and carbon tetrachloride, chloroform, and acetone. The invention is also applicable to the separation of individual components from a system of cymenes and a system including the xylenes.

This invention can also be utilized to purify naphthalene, hydroquinone (1,4-benzenediol), para-cresol, para-dichlorobenzene, and such materials as high melting waxes, fatty acids, and high molecular weight normal paraffins. The system can also be used to separate anthracene, phenanthrene, and carbazole. Furthermore, the system can be used to separate durene (1,2,4,5-tetramethylbenzene from C₁₀ aromatics. In cases where the material to be purified has a relatively high crystallization point, the impure material is heated to a temperature at which only a portion of the constituents are in a crystalline state and the resulting slurry is handled at such a temperature that operation is as described in connection with materials which crystallize at lower temperatures.

The invention is also applicable to the concentration of food products. In the preparation of such concentrated foods, the process consists generally of the removal of water from such products. One special class of foods which can be concentrated in this manner is that of fruit juices, such as grape, pineapple, watermelon, apple, orange, lemon, lime, tangerine, grapefruit, and the like. Beverages, such as milk, wine, beer, coffee, tea, and various liquors, can also be concentrated in such a process. The process is also applicable to the concentration of vegetable juices.

A better understanding of the invention will result from reference to the drawing wherein like numerals refer to like elements in the various figures wherever possible.

Referring particularly to Figure 1, a feed stream comprising, for example, a mixture of dimethyl phthalates is introduced to chiller 11 by means of line 12. Chiller 11 can be a conventional scraped surface chiller operated at a temperature which will freeze at least a portion of the component to be separated from the mixture. The resulting slurry of crystals and mother liquor is passed from chiller 11 to filter 13 which can be a conventional rotary filter. Mother liquor is removed from the system through line 14 and the crystals pass through conduit 15 to chamber 16 where the temperature is such that a portion of the crystals are melted. The resulting slurry is introduced into crystal purification column 17 by suitable means such as by the action of piston 16'. Other means such as a screw conveyor can also be utilized.

The crystals are compacted and moved toward the melting section 18 of column 17 by piston 19 which is actuated by flow of fluid in lines 21 and 22 to cylinder 23. Mother liquor is removed in filtering section 24 which can be perforated section 25 of column 17 enclosed by a bustle ring 26. Mother liquor is passed by line 27 to a reprocessing step. The mother liquor is usually returned to feed line 12 and thus recycled to the process.

As the mass of crystals is moved toward the melting zone 18 the flow of crystals is diverted toward the walls of the column by baffle 28 which is supported upon distributor ring 29 having openings 31 around its periphery. Crystal melt is withdrawn from the heated portion of column 17 by line 32 and pump 33. One portion of crystal melt is passed through line 34 and heater 35 to distributor ring 29. The remaining portion is removed through line 36 as product.

Figure 2:
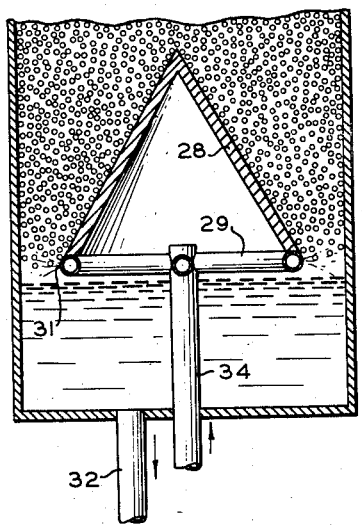
Figure 2 shows the details of the baffle and distributor ring arrangement of the modification described with respect to Figure 1.
Figure 1:
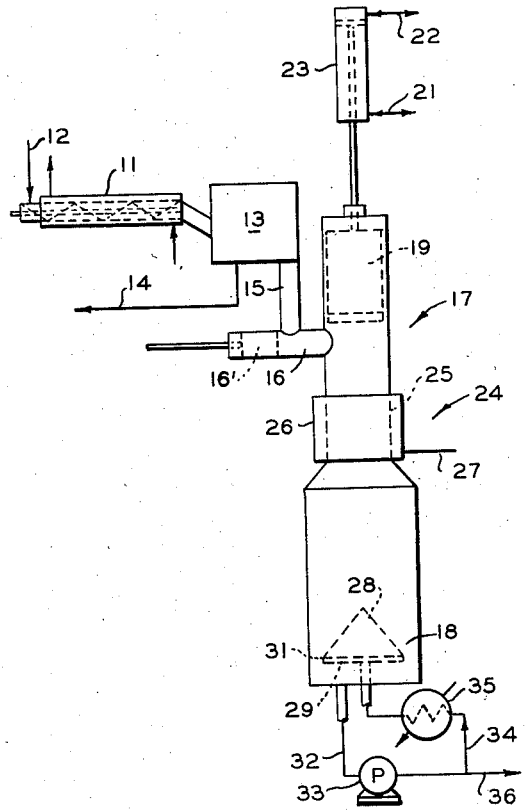
Figure 4:
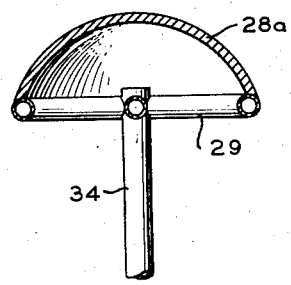
Figure 4 shows a modification wherein the baffle 28a is in the shape of a dome.
Figure 3:
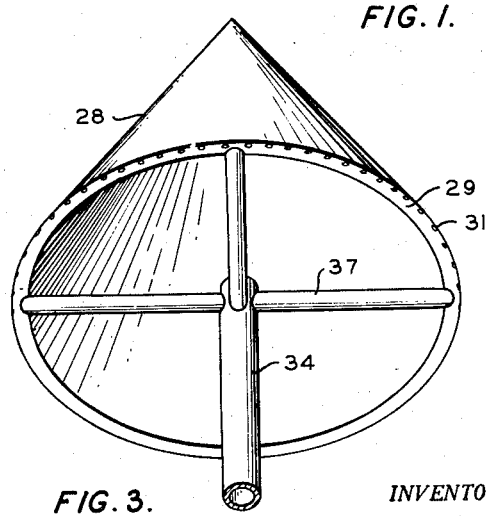
Figure 3 shows one arrangement of lines 37 which conduct the heated melt to distributor ring 29.
Figure 5:
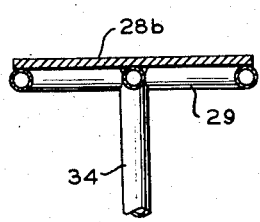
Figure 5 shows a baffle 28b as a flat plate.

The preferred modification is the cone-shaped baffle of Figures 1, 2 and 3 because the flow of crystals is diverted toward the walls of the column with a minimum of frictional loss. Substantially the same effects are obtained by the modifications of Figures 4 and 5 but frictional losses are greater because the crystals themselves tend to form a baffle of substantially cone shape above the dome or flat baffle. This substantially stationary cone of crystals offers more resistance to the flow of crystals than does the smooth surface of the baffle.

The angle of the cone-shaped baffle, at its apex, is preferably less than about 45° and will usually be about 30°. The angle of shear of the crystal mass establishes the optimum angle for the baffle and the angle of shear is determined by the compactness of the crystal mass and also by the shape of the individual crystals.

The crystals are compacted to a greater extent near the walls of the column by the baffle device of the invention and the flow of melt through the crystals is directed toward the less compacted crystals in the center portion of the column. Channelling of the melt through the crystal mass is greatly reduced because channelling usually occurs along the walls of the column.

Better understanding of the invention will result from the following example which illustrates the invention but is not to be construed to limit the invention.

*Example*

A eutectic mixture of dimethyl isophthalate and dimethyl terephthalate in solution in methyl alcohol contains trace impurities which must be removed. The mixture is chilled in chiller 11 so as to form crystals of the eutectic mixture, filtered in filter 13 and passed into column 17. The mixture, containing 75 weight percent of the eutectic mixture and impurities and 25 weight percent methyl alcohol, in the form of a slurry containing 40 weight percent solids, is fed to the column at a rate of 100 pounds per hour. The temperature of the slurry is about 107° F. The crystals are moved toward the melting zone 18 by piston 19 and mother liquor is removed from the crystal mass in filter section 24 and passed from the system through line 27. Baffle 28 diverts the flow of crystals toward the walls of the column and the crystals are melted by the flow of hot crystal melt introduced by distributor ring 29. The melt flows through the melting crystals and refreezes, displacing occluded mother liquor and impurities which are removed through line 27. The total flow of mother liquor and impurities through line 27 is 60 pounds per hour. Melt is removed from the column through line 32 at the rate of 1750 pounds per hour and at temperature of 160° F. Purified melt is removed as produce at the rate of 40 pounds per hour and 1710 pounds per hour of melt are heated, in heater 35, to a temperature of 165° F. and supplied to distributor ring 29.

The device of my invention causes the density of the crystal mass to be the greatest near the walls of the column where channelling is most likely to occur. Utilization of the device of my invention permits a substantial increase in the throughput of material in a crystal purification column at a constant product purity.

Variations and modifications are possible within the scope of the disclosure of the present invention, the essence of which is the provision, in a crystal purification column, of a baffle means supported upon a hot recycle melt distribution means to minimize channelling of hot melt through the crystal mass.

That which is claimed is:

1. For use in a crystallization column having a crystal and mother liquor inlet in one end portion, a crystal melting section and crystal melt outlet in the other end portion, a mother liquor outlet intermediate the two end portions, and means to move crystals in the form of a compact mass toward the crystal melting section, apparatus comprising an annular fluid distribution means having an inlet and having a plurality of outlets around its periphery coaxially positioned in said melting section and spaced from the wall of said melting section; a circular baffle means of substantially the same diameter as that of said fluid distribution means coaxially positioned upon said distribution means; means for removing melt from said melt outlet in the end portion of said column; means for recovering a first portion of said melt as product; means for heating a second portion of said melt; and means for passing the heated portion of melt to said fluid distribution means inlet.

2. The apparatus of claim 1 wherein the baffle means is in the shape of a cone with its base positioned upon said distribution means and its apex in the path of the moving crystals.

3. The apparatus of claim 1 wherein the baffle means is in the shape of a dome with its base positioned upon the fluid distribution means and its convex side in the path of the moving crystals.

4. The apparatus of claim 1 wherein the baffle means is a flat plate.

5. An apparatus for purification of crystals contained in mother liquor which comprises an elongated column having a crystal and mother liquor inlet in one end portion; a crystal melting section and crystal melt outlet in the other end portion; a mother liquor outlet intermediate the two end portions; means to compact said crystals and to move said crystals as a compact mass toward said melting section; an annular fluid distribution means having a fluid inlet and having a plurality of fluid outlets around its periphery coaxially positioned in said melting section and spaced from said melting section wall; a circular baffle means of substantially the same diameter as that of said distribution means coaxially positioned upon said distribution means; means for removing melt from said melt outlet in the end portion of said column; means for recovering a first portion of said melt as product; means for heating a second portion of said melt; and means for passing the heated portion of melt to said distribution means inlet.

6. In the purification of crystals wherein a slurry of crystals and mother liquor is moved through a purification zone, mother liquor is removed from said zone, the crystals are moved as a compact mass towards a melting zone, and purified crystal melt is removed from the melting zone, the improvement comprising heating a portion of the removed melt; passing the heated crystal melt into said melting zone as a plurality of streams spaced from and adjacent the periphery of the melting zone and in countercurrent flow relationship to the movement of crystals to melt at least a portion of said crystals; and diverting the movement of crystals being moved toward said melting zone toward the periphery of said melting zone.

References Cited in the file of this patent

UNITED STATES PATENTS

| | | |
|---|---|---|
| 2,035,441 | Allen et al. | Mar. 31, 1936 |
| 2,324,869 | Oman | July 20, 1943 |
| 2,617,274 | Schmidt | Nov. 11, 1952 |
| 2,747,001 | Weedman | May 22, 1956 |
| 2,765,921 | Green | Oct. 9, 1956 |